(12) United States Patent
Thiele et al.

(10) Patent No.: US 11,943,076 B2
(45) Date of Patent: Mar. 26, 2024

(54) USER STATION FOR A SERIAL BUS SYSTEM AND METHOD FOR COMMUNICATION IN A SERIAL BUS SYSTEM

(71) Applicant: Robert Bosch GmbH, Stuttgart (DE)

(72) Inventors: Stefan Thiele, Reutlingen (DE); Arthur Mutter, Neuhausen (DE); Christian Horst, Dusslingen (DE); Florian Hartwich, Reutlingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 108 days.

(21) Appl. No.: 17/665,326

(22) Filed: Feb. 4, 2022

(65) Prior Publication Data

US 2022/0255768 A1     Aug. 11, 2022

(30) Foreign Application Priority Data

Feb. 8, 2021    (DE) ...................... 10 2021 201 120.9

(51) Int. Cl.
    *H04L 12/40*         (2006.01)
(52) U.S. Cl.
    CPC .. *H04L 12/40052* (2013.01); *H04L 12/40006* (2013.01); *H04L 2012/40215* (2013.01); *H04L 2012/40273* (2013.01)

(58) Field of Classification Search
    CPC ...................................................... G06F 21/53
    See application file for complete search history.

(56) References Cited

U.S. PATENT DOCUMENTS 10,021,041 B2\*   7/2018   Yousefi ................ G07C 5/0866
2016/0344764 A1\*   11/2016   Otsuka ..................... H04L 63/08

FOREIGN PATENT DOCUMENTS

| DE | 102009001377 A1 | 9/2009 |
|---|---|---|
| DE | 102016216495 A1 | 3/2018 |
| DE | 102020200850 A1 | 7/2021 |
| DE | 102020201606 A1 | 8/2021 |

\* cited by examiner

*Primary Examiner* — Henry Tsai
*Assistant Examiner* — Juanito C Borromeo
(74) *Attorney, Agent, or Firm* — NORTON ROSE FULBRIGHT US LLP; Gerard A. Messina (57) ABSTRACT

A user station for a serial bus system and a method for communication in a serial bus system. The user station includes an application for carrying out a task, a transceiver unit for serially receiving a message in the form of a frame from a bus of the bus system, via which user stations of the bus system exchange messages with one another, and a filter module for filtering the received frame. The filter module for filtering is designed to check at least two segments of the frame separately to determine whether or not the received frame is to be passed on to the application.

15 Claims, 3 Drawing Sheets

USER STATION FOR A SERIAL BUS SYSTEM AND METHOD FOR COMMUNICATION IN A SERIAL BUS SYSTEM

FIELD

The present invention relates to a user station for a serial bus system and a method for communication in a serial bus system, in which each user station of the bus system receives all messages sent via a bus of the bus system.

BACKGROUND INFORMATION

Bus systems for communication between sensors and control units, for example in vehicles, are to enable the transfer of a large amount of data depending on the number of functions of a technical system or a vehicle. Examples of such bus systems are a CAN-based bus system, FlexRay, or the like.

For example, a bus system is presently in the introduction phase in vehicles, in which data are transferred as messages in the standard ISO 11898-1:2015 as the CAN protocol specification using CAN FD. The messages are transferred between the bus users of the bus system, such as sensor, control unit, sender, etc. For this purpose, the message is sent on the bus in a frame which switches between two communication phases. In the first communication phase (arbitration) it is negotiated which of the user stations of the bus system may send their frames on the bus in the following second communication phase (data phase or sending of the payload). CAN FD is used by most manufacturers in the first step at 500 kbit/s arbitration rate and 2 Mbit/s data bit rate in the vehicle. Therefore, during the transfer on the bus, it is to switch back and forth between a slow operating mode and a fast operating mode.

To enable even higher data rates in the second communication phase, presently a successor bus system for CAN FD is being developed, which is called CAN XL and is presently being standardized by the organization CAN in Automation (CiA). CAN XL is also to assist other functions via the CAN bus in addition to mere data transport, such as functional safety, data security, and quality of service (QoS). These are elementary properties which are required in an autonomously driving vehicle.

Independently of the type of the bus system, in each bus system, every sent message has to arrive via a bus at the user station(s), for which the message is intended or which uses the data contained in the message. However, some applications which the user station executes do not need the data of all messages.

Therefore, the user station(s) may use a communication module, which only passes on the messages received from the bus or their data, which are also used in the application, to an application of the user station. The communication module may distinguish, on the basis of a numeric identifier of the messages, which message is to be passed on and which is not. The communication module thus carries out acceptance filtering for the messages.

In such acceptance filtering, the communication module may use lists having identifiers which determine which messages the communication module on the application is to accept and therefore let through. It is possible that the communication module masks parts of the identifiers for the filtering, so that each list entry may stand for a group of identifiers. Alternatively, the filtering may use lists of identifiers which are not to be accepted, and thus are to be blocked. These acceptance and/or blocking lists are configurable via software.

It is problematic if an application uses messages from a broad spectrum of identifiers. In particular, in this case, it is possible that the filtering options of the hardware communication module are not sufficient to let through all required messages and at the same time to block all superfluous messages. In such a case, the application software has to apply computing power for the remaining acceptance filtering. The application may thus possibly no longer ensure the speed which is required for operation of the application.

SUMMARY

It is therefore an object of the present invention to provide a user station for a serial bus system and a method for communication in a serial bus system, which solve the above-mentioned problems. In particular, a user station for a serial bus system and a method for communication in a serial bus system are to be provided, in which a larger number of different messages may also be filtered with respect to acceptance exclusively in a communication module of the user station, without application software of the user station having to apply computing power for the acceptance filtering.

The object may be achieved by a user station for a serial bus system in accordance with an example embodiment of the present invention. In accordance with an example embodiment of the present invention, the user station includes an application for carrying out a task, a transceiver unit for serially receiving a message in the form of a frame from a bus of the bus system, via which user stations of the bus system exchange messages with one another, and a filter module for filtering the received frame, the filter module for filtering being designed to check at least two different segments of the frame separately in order to determine whether or not the received frame is to be passed on to the application.

The design of the user station enables a communication module to be able to check more than only a single numeric identifier of a message received from the bus.

In addition, the user station ensures, due to the separation of filter instructions and reference values, that the reference values are reused for more than one filter instruction. Memory capacity may thus be saved. As a result of this, the costs for the hardware of the user station decrease.

Using the user station, it is possible in particular in a CAN-based bus system to maintain an arbitration from CAN in a first communication phase and nonetheless to significantly increase the transfer rate once again over CAN or CAN FD.

The method carried out by the user station may also be used if at least one CAN user station and/or at least one CAN FD user station is also present in the bus system, which send messages according to the CAN protocol and/or CAN FD protocol.

Advantageous further embodiments of the user station are disclosed herein.

In accordance with an example embodiment of the present invention, the filter module is possibly designed to check the at least two different segments of the frame on the basis of filter instructions in comparison to reference data, the filter module being designed to reuse the reference data for more than one filter instruction.

In one special embodiment of the present invention, the filter module includes a first memory block for storing filter instructions for filtering the at least two different segments of the received frame, a second memory block for storing reference data for comparison to at least one of the two different segments of the received frame, and a checking block for checking the filter instructions with regard to the reference data to determine whether or not the received frame is to be passed on to the application.

The filter instructions may define which segment of the received frame is to be compared to which reference data.

The filter instructions may define how the comparison result is to be logically linked to an overall result.

It is possible that one of the filter instructions includes at least one first instruction, which indicates which received frame is to be accepted, and includes at least one second instruction, which indicates what is to be carried out using an accepted frame. The at least one second instruction may indicate here in which memory area the received and accepted frame is to be stored. Additionally or alternatively, the at least one second instruction may indicate that and how the received frame is to be marked.

Optionally, the filter module may be designed to add predetermined pieces of information including specifications on the completed filtering to a received and accepted frame.

It is possible that the reference data include a reference value which is provided for comparison to at least one of the segments, and include a mask, using which after a bitwise comparison between reference value and the segment, the comparison result is bitwise masked, the reference value and the mask each having the same bit width as the segment.

It is possible that all segments have the same bit width.

In one embodiment of the present invention, at least one of the segments may have a different bit width than at least one other segment.

It is possible that the frame formed for the message is constructed to be compatible with CAN FD, it being negotiated in the first communication phase which of the user stations of the bus system receives an at least temporarily exclusive, collision-free access to the bus in the following second communication phase.

The above-described user station may be part of a bus system which also includes a bus and at least two user stations, which are connected to one another via the bus in such a way that they may communicate serially with one another. At least one of the at least two user stations is an above-described user station.

The above-mentioned object is moreover achieved by a method for communication in a serial bus system in accordance with the present invention. The method is carried out using a user station of the bus system, which includes an application for carrying out a control task and a transceiver unit. In accordance with an example embodiment of the present invention, the method includes the steps of serially receiving, using the transceiver unit, a message in the form of a frame from a bus of the bus system, via which user stations of the bus system exchange messages with one another, filtering, using a filter module, the received frame, the filter module separately checking at least two different segments of the frame in the step of filtering to determine whether or not the received frame is to be passed on to the application.

The method offers the same advantages as were mentioned above with reference to the user station.

Further possible embodiments of the present invention also include combinations which are not explicitly mentioned here of features or specific embodiments described above or hereinafter with respect to the exemplary embodiments. Those skilled in the art will also add individual aspects as improvements or additions to the particular basic form of the present invention, in view of the disclosure herein.

BRIEF DESCRIPTION OF THE DRAWINGS

The present invention is described in greater detail hereinafter with reference to the figures and on the basis of exemplary embodiments.

In the figures, identical or functionally identical elements are provided with the same reference numerals if not indicated otherwise.

DETAILED DESCRIPTION OF EXAMPLE EMBODIMENTS

Figure 1:
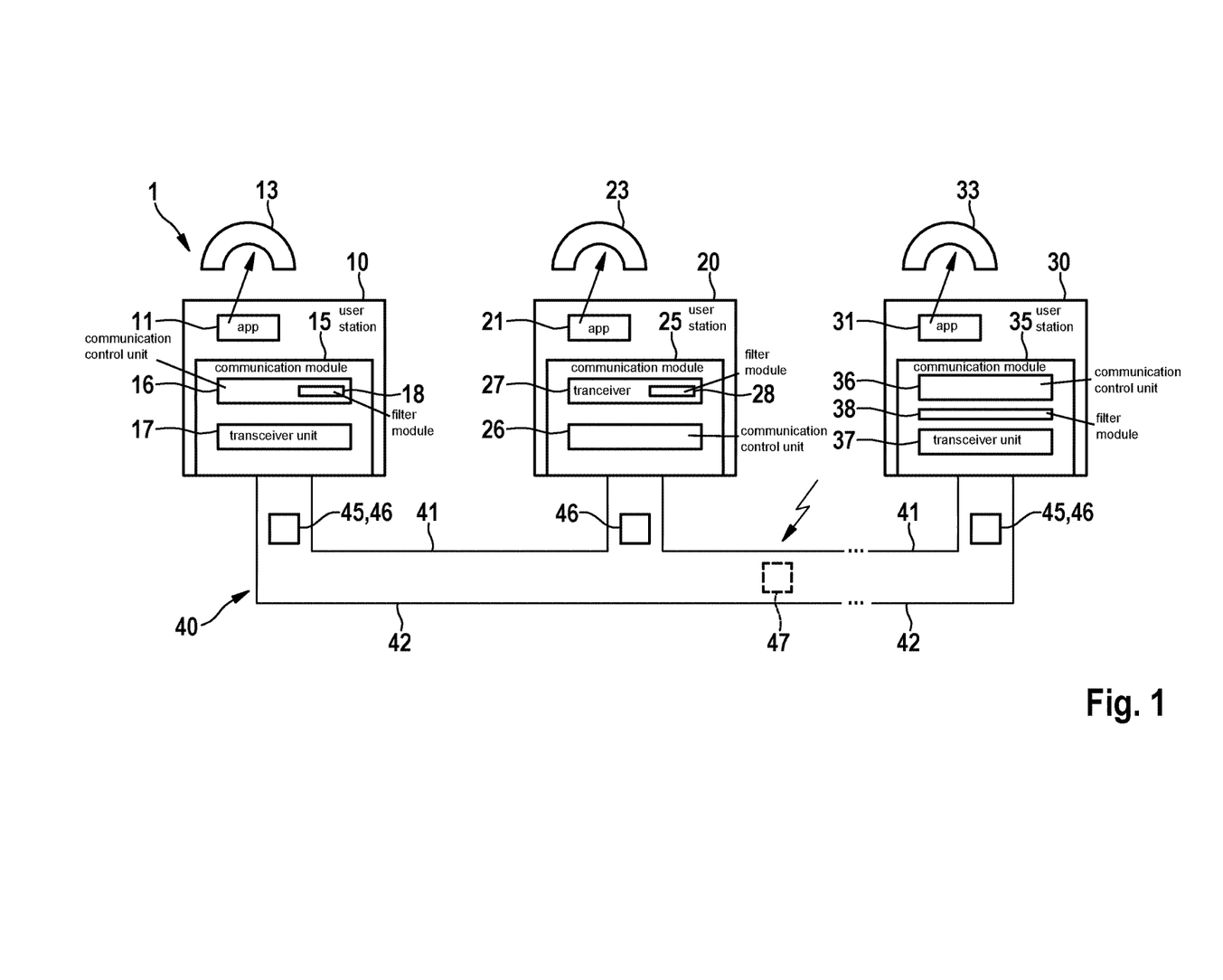
FIG. 1 shows a block diagram of a bus system according to a first exemplary embodiment of the present invention.

FIG. 1 shows, as an example, a bus system 1, which is designed in particular to be the foundation of a CAN bus system, a CAN FD bus system, a CAN XL bus system, and/or modifications thereof, as described hereinafter. However, the bus system may alternatively be designed for FlexRay or any other serial bus system.

In FIG. 1, bus system 1 includes a plurality of user stations 10, 20, 30, which are each connected to a bus 40 including a first bus wire 41 and a second bus wire 42. Bus wires 41, 42 may also be called CAN_H and CAN_L or CAN XL_H and CAN XL_L in a CAN-based bus system and are used for electrical signal transfer after coupling in the particular levels for a signal in the send mode. In a CAN-based bus system, dominant levels are coupled in or recessive levels are generated at least temporarily to send a signal in the send mode via bus 40.

Messages 45, 46 are serially transferable in the form of signals between individual user stations 10, 20, 30 via bus 40. If an error occurs during the communication on bus 40, as shown by the jagged black block arrow in FIG. 1, an error frame 47 (error flag) may optionally be sent.

Bus system 1 may be used in a vehicle, in particular in a motor vehicle, an aircraft, etc., or in a hospital, etc. User stations 10, 20, 30 are, for example, control units, sensors, display devices, etc. of a motor vehicle.

As shown in FIG. 1 user station 10 includes an application 11 and a communication module 15. Communication module 15 includes a communication control unit 16, a transceiver unit 17, and a filter module 18. Filter module 18 is provided in communication control unit 16.

User station 20 includes an application 21 and a communication module 25. Communication module 25 includes a communication control unit 26, a transceiver unit 27, and optionally a filter module 28. Filter module 28 is provided in transceiver unit 27.

User station 30 includes an application 31 and a communication module 35. Communication module 35 includes a communication control unit 36, a transceiver unit 37, and a filter module 38. Filter module 38 is provided separately from communication control unit 36 and transceiver unit 27 in communication module 35.

Transceiver units 17, 27, 37 of user stations 10, 20, 30 are each directly connected to bus 40, even if this is not illustrated in FIG. 1.

Application 11 may be software which is executable by a microcontroller of user station 10. Application 11 may include at least one computer program. If user station 10 is, for example, a control unit for a windshield wiper, application 11 may be software for controlling the movement of the windshield wiper. The software may use, for example, the data of a rain sensor and/or a velocity sensor to automatically control the movement of the windshield wiper. The rain sensor and/or the velocity sensor may be user stations of bus system 1 and may send their data via bus 40. Very generally, application 11 carries out a task 13, in particular a control task, which is to be carried out by user station 10. Task 13 may induce a movement of at least one part, which may be mechanically and/or electrically and/or pneumatically and/or hydraulically driven. Alternatively or additionally, task 13 may include a calculation and/or comparison and/or a detection of data.

Moreover, application 21 may be software which is executable by a microcontroller of user station 20. Application 11 carries out a task 23 which is to be carried out by user station 20. Moreover, application 31 may be software which is executable by a microcontroller of user station 20. Application 31 carries out a task 33 which is to be carried out by user station 30. The same applies for applications 23, 33 as described above for application 11.

Communication control units 16, 26, 36 are each used for controlling a communication of particular user station 10, 20, 30 via bus 40 with at least one other user station of user stations 10, 20, 30, which are connected to bus 40. Messages 45, 46 are exchanged between user stations 10, 20, 30, in particular their applications 11, 21, 31, via bus 40.

Communication control units 16, 36 create and read first messages 45, which are, for example, modified CAN messages 45. Modified CAN messages 45 are constructed on the foundation of a CAN XL format, which is described in greater detail in reference to FIG. 2. Communication control units 16, 36 may moreover be designed to provide a CAN XL message 45 or a CAN FD message 46 for transceiver unit 37 or receive these messages therefrom. Communication control units 16, 36 thus create and read a first message 45 or second message 46, first and second method 45, 46 differing due to their data transfer standard, namely in this case CAN XL or CAN FD.

Communication control unit 26 may be designed like a conventional CAN controller according to ISO 11898-1: 2015, i.e., like a CAN FD-tolerant classical CAN controller or a CAN FD controller. Communication control unit 26 creates and reads second messages 46, for example, CAN FD messages 46. CAN FD messages 46 may include a number of 0 to 64 data bytes, which are also transferred in addition at a significantly faster data rate than in the case of a classical CAN message. In particular, communication control unit 26 is designed like a conventional CAN FD controller.

Transceiver unit 27 may be designed like a conventional CAN transceiver according to ISO 11898-1:2015 or CAN FD transceiver. Transceiver units 17, 37 may be designed to provide messages 45 according to the CAN XL format or messages 46 according to the present CAN FD format for associated communication unit 16, 36 or receive these messages therefrom as needed.

Forming and then transferring messages 45 using the CAN XL format and receiving such messages 45 is implementable using the two user stations 10, 30.

Figure 2:
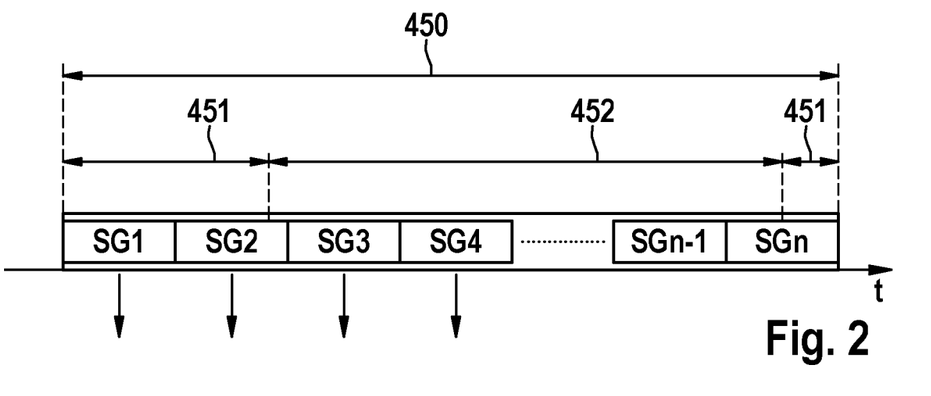
FIG. 2 shows a schematic diagram to illustrate the structure of a message which may be sent by a user station of the bus system according to the first exemplary embodiment of the present invention.

FIG. 2 shows, for message 45, a frame 450, as is received serially from bus 40 by transceiver unit 17 over time t and may be provided to communication control unit 16.

Frame 450 may be a CAN or CAN FD frame or a CAN XL frame in a CAN-based bus system. The CAN XL frame may be transferred in the bus system at an increased net data transfer rate in comparison to CAN or CAN FD, in particular at approximately 10 Mb per second. Moreover, the size of the payload per CAN XL frame may be approximately 2 kB or have any other value, for example, between 1 byte and 2 kB. In this case, communication control unit 16 creates a CAN XL frame in the present exemplary embodiment, for example, as compatible with CAN FD. The same also applies similarly to communication control unit 36 and transceiver unit 37 of user station 30.

According to FIG. 2, serially received frame 450 is divided over time t into different segments SG1, SG2, SG3, SG4 to SGn−1, SGn. Segments SG1 to SGn may be associated with different communication phases 451, 452, namely in the case of CAN an arbitration phase 451 and a following data phase 452. Segment SG1 is received first, then segment SG2, and so on.

In the example of FIG. 2, segment SG1 forms an arbitration field including an identifier (ID). Segment SG2 is a control field of frame 450. Segments SG3, SG4 each form a part of the data field of frame 450. The data field ends in segment SGn−1.

Alternatively, for example, segments SG1, SG2 form an arbitration field having an identifier (ID). Segments SG3, SG4 form a control field. A data field of frame 450 begins subsequently, thus with a segment SG5, and ends in segment SGn−1. Other classifications of segments SG1 to SGn are possible.

In segment SGn, a checksum field and a frame termination field including a field for switching over between communication phases 452, 451 and a frame end field may be provided. Segments SG1 to SGn are each of equal length in the present exemplary embodiment, as shown in the example of FIG. 2.

In arbitration phase 451, it is bitwise negotiated between user stations 10, 20, 30 with the aid of the identifier (ID) which user station 10, 20, 30 wishes to send message 45, 46 having the highest priority and therefore receives exclusive access to bus 40 of bus system 1 for the upcoming time for sending in subsequent data phase 452. In arbitration phase 451, a physical layer is used as in CAN and CAN FD. The physical layer corresponds to the bit transfer layer or layer 1 of the conventional OSI model (Open Systems Interconnection Model).

An important point during phase 451 in a CAN-based bus system is that the conventional CSMA/CR method is used, which permits simultaneous access of user stations 10, 20, 30 to bus 40, without higher priority message 45, 46 being destroyed. Further bus user stations 10, 20, 30 may thus be added to bus system 1 relatively easily, which is very advantageous.

The CSMA/CR method has the result that there must be so-called recessive states on bus 40, which may be overridden by other user stations 10, 20, 30 having dominant states on bus 40. In the recessive state, high-resistance conditions prevail at individual user stations 10, 20, 30, which, in combination with the parasites of the bus circuitry, results in longer time constants.

If CAN XL and CAN FD are compatible, the frame formats of CAN FD and CAN XL are identical up to the res bit or XLF bit. The res bit from CAN FD, which is called the XLF bit hereinafter, is used for switching over from the CAN FD format to the CAN XL Format. A receiver first recognizes at the res bit, in which format frame 450 is sent. A CAN XL user station, thus user stations 10, 30 here, also supports CAN FD.

In data phase 452, in addition to a part of the control field, the payload of CAN XL frame 450 or message 45 from the data field and a checksum field are sent. A field then follows which is used to switch over from data phase 452 back to arbitration phase 451, as already mentioned above.

A sender of message 45 begins a sending of bits of data phase 452 on bus 40 only when user station 10 has won the arbitration as the sender and user station 10 as the sender thus has exclusive access to bus 40 of bus system 1 for sending.

Figure 3:
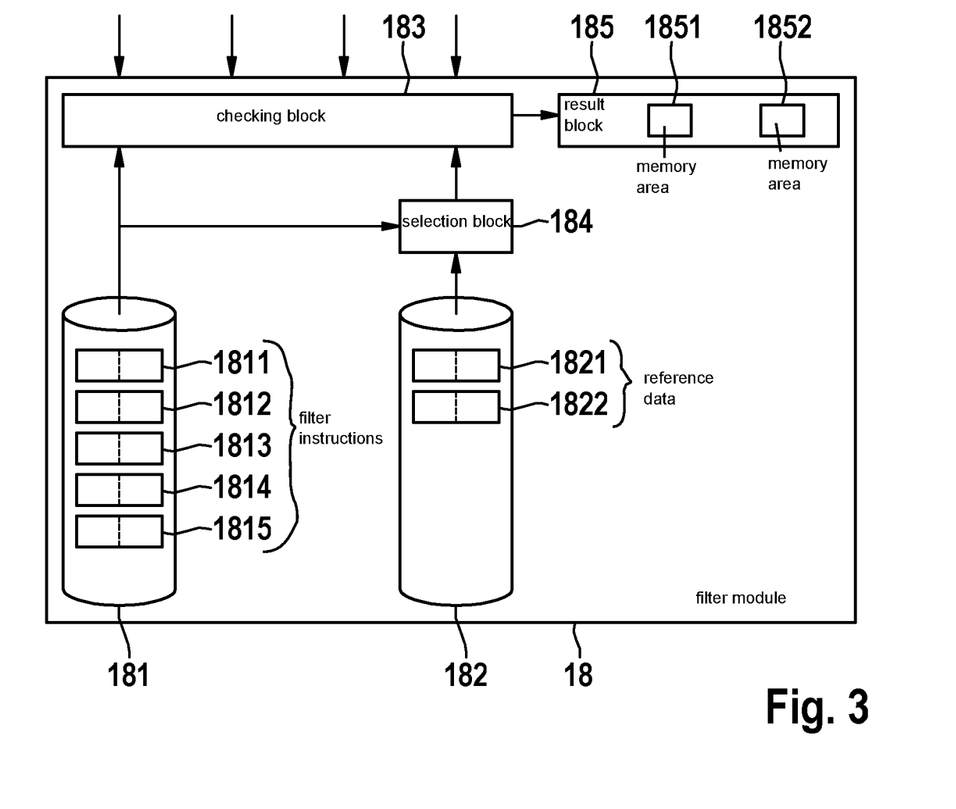
FIG. 3 shows a block diagram of a filter module of the user station of the bus system according to the first exemplary embodiment of the present invention.

As shown in FIG. 3, filter module 18 of user station 10 evaluates frame 450. Filter module 18 uses above-described segments SG1 to SGn of frame 450. Filter module 18 may establish the length of individual segments SG1 to SGn. Moreover, filter module 18 may establish how many of segments SG1 to SGn are evaluated jointly. Moreover, filter module 18 may establish which of segments SG1 to SGn are evaluated jointly. It is possible that the jointly evaluated segments of segments SG1 to SGn follow one another directly in frame 450 or that at least one other segment of segments SG1 to SGn is provided between jointly evaluated segments SG1 to SGn. In addition, it is possible that at least one segment of segments SG1 to SGn is evaluated multiple times to verify the segment. In such a case, one segment is compared in succession to more than one reference value and evaluated. Therefore, in particular one segment could be evaluated using four reference values for verification. Alternatively or additionally, four segments are each evaluated using one reference value for verification. In both mentioned special examples, in total up to four verifications are carried out. Of course, other examples for repeated evaluation of at least one segment are possible to verify the segment.

First segments SG1 to SGn of frame 450 are available to filter module 18 for the filtering. As described above, these are, for example, in a CAN frame 450 the header, which contains the identifier and the message format, and the beginning of the data field.

According to FIG. 3, filter module 18 includes a first memory block 181, a second memory block 182, a checking block 183, a selection block 184, and a result block 185. A plurality of filter instructions 1811 to 1815 is stored in first memory block 181. A plurality of reference data 1821 to 1822 is stored in second memory block 182.

Reference data 1821 to 1822 are provided in separate lists. Each of these lists may be used by each filter instruction 1811 to 1815. Reference data 1821 to 1822 may each include, for example, a 32-bit reference value and a 32-bit mask. Reference data 1821 to 1822 may thus each be in two parts, as shown by dashed lines in FIG. 3. The reference value has the same bit number as the mask.

Filter instructions 1811 to 1815 define which pieces of information of a message 45 or its frame 450 checking block 183 has to compare to which reference data 1821 to 1822. Additionally or alternatively, filter instructions 1811 to 1815 define how the comparison results ascertained by checking block 183 are logically linked or are to be linked by result block 185 to form an overall result. Selection block 184 selects the plurality of reference data 1821 to 1822 for the checking block on the basis of filter instructions 1811 to 1815.

The filter method of filter module 18 separates filter instructions 1811 to 1815 from reference data 1821 to 1822, in particular their reference values.

As shown in FIG. 3, each of filter instructions 1811 to 1815 has two instruction parts, as shown by dashed lines in FIG. 3. A first instruction part of particular filter instruction 1811 to 1815 contains specifications on the acceptance check of frame 450, which is to be carried out by the checking block. A second instruction part of particular filter instruction 1811 to 1815 contains specifications for the processing of an accepted frame 450. In general:

A filter instruction, for example filter instruction 1811, may instruct in its first part checking block 183 to check multiple segments SG1 to SGn of frame 450 or message 45.

A filter instruction, for example filter instruction 1812, defines in its first part which segments of segments SG1 to SGn are to be compared in checking block 183 to which of reference data 1821, 1822 and verified.

A filter instruction, for example filter instruction 1813, may instruct in its first part that multiple such comparisons, which checking block 183 has carried out, are logically combined with one another. The combination may also be carried out in checking block 183.

A filter instruction contains in its second part instructions which are carried out when frame 450 or message 45 has been accepted. For example, filter instruction 1811 may contain in its second part an instruction that checked frame 450 or message 45 is to be stored in a predetermined memory area 1851 or 1852 in result block 185. This instruction may apply for an accepted and/or a non-accepted frame 450 or message 45. According to another example, filter instruction 1812 may include in its second part an instruction to mark checked frame 450 or message 45. The marking may in particular indicate or mean a high priority of checked frame 450 or message 45. The marking may in particular indicate that checked frame 450 or message 45 is a frame 450 or a method 45 which is listed on a blocking list, which is also called a blacklist.

Filter instructions 1811 to 1815 therefore also define what is to take place with an accepted frame 450 or message 45. Possibilities for processing of accepted frame 450 are, for example, storing and/or marking frame 450.

Figure 4:
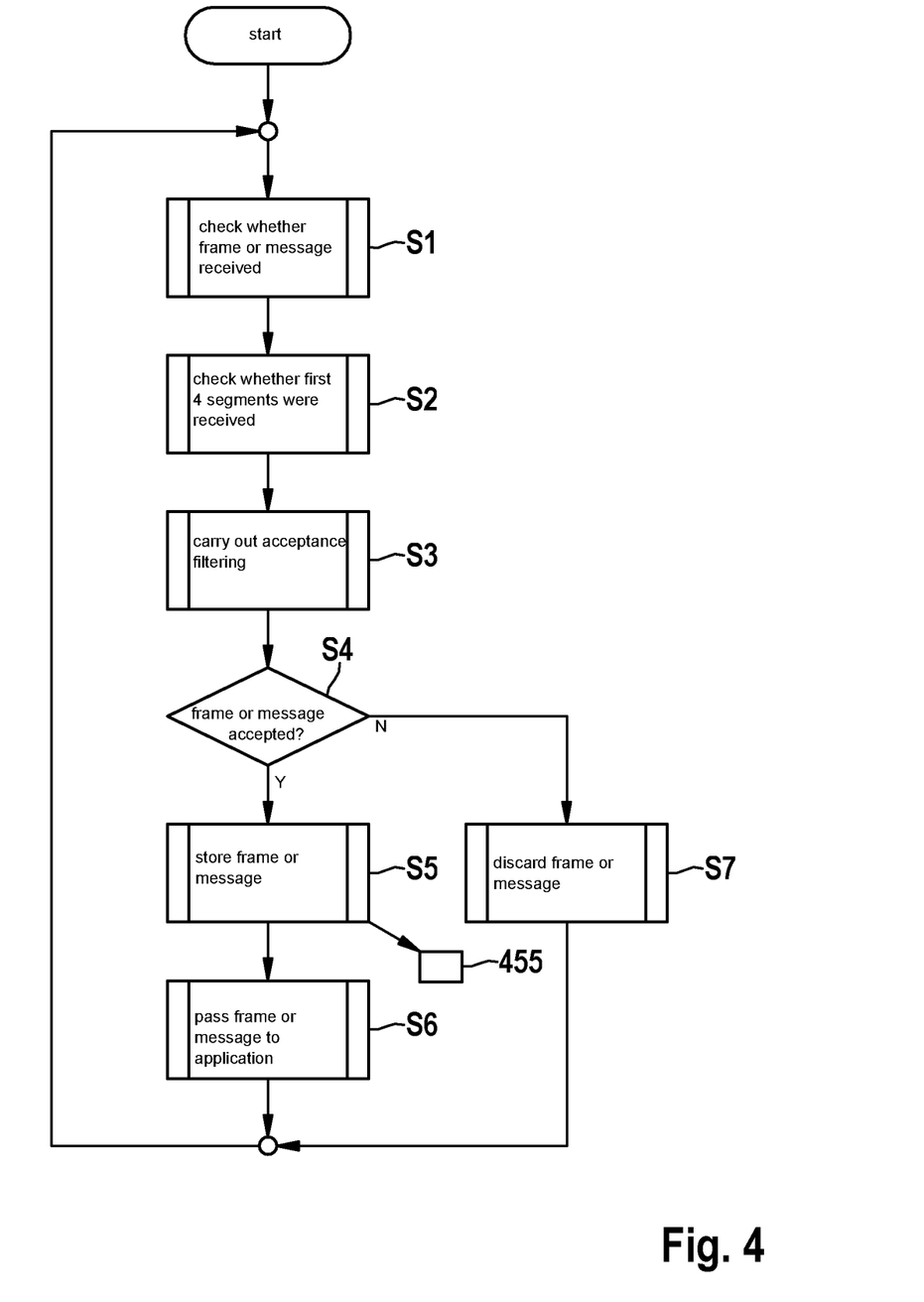
FIG. 4 shows a flowchart of a method which is carried out by the filter module upon receiving a message from a bus of the bus system according to a first exemplary embodiment of the present invention.

FIG. 4 shows a filtering method carried out by filter module 18. After beginning the method, checking module 183 checks in a first step S1 whether a frame 450 or a message 45 is received. If the answer is YES in step S1, the sequence continues to a step S2.

In step S2, checking module 183 checks whether first 4 segments SG1 to SG4 were received during the reception of a frame 450, for example. In general, checking module 183 may check at least two segments SG1, SG2. If the answer is YES in step S2, the sequence continues to a step S3.

In step S3, checking block 183 carries out an acceptance filtering using memory blocks 181, 182 and selection block 184. For this purpose, checking block 183 checks the list of filter instructions 1811 to 1815 in memory block 181 one after another, until a filter instruction is found among filter instructions 1811 to 1815 which accepts segments SG1 to SG4. If checking block 183 has not found a matching filter instruction 1811 to 1815 after processing the complete list, checking block 183 may thus optionally check and carry out an alternative instruction.

For the checking of segments SG1 to SG4 in step S3, reference is made to particular reference data 1821, 1822, which are provided in the separate lists for reference data 1821, 1822 of memory block 182. Each reference datum of reference data 1821, 1822 has a reference value, which may also be called a setpoint value, and a mask, both having the same bit width as the bit width of one of segments SG1 to SGn. The term "bit width" includes here that all segments SG1 to SGn have the same number of bits and the length of individual segments SG1 to SGn is equal. Each of segments SG1 to SGn has at least two bits. For example, each of segments SG1 to SGn has a number of 32 bits.

During the checking of each segment of segments SG1 to SGn, checking block 183 first carries out a bitwise comparison between particular segment SG1 to SGn and the reference value or setpoint value. Checking block 183 then bitwise masks the result in result block 185. For example, checking block 183 first carries out a bitwise comparison between the first bit of segment SG1 and the associated reference value. Subsequently, checking block 183 carries out a bitwise comparison between the second bit of segment SG1 and the associated reference value. Such a comparison is also carried out for all other bits of segment SG1 up to a comparison between the last bit of segment SG1 and the associated reference value.

The individual results, in particular conformance ü or not, are logically interpreted in step S3 in filter instruction 1811 to 1815, this is, for example:

individual result is accepted if there is conformance between segment and reference value or setpoint value
    individual result is accepted if there is no conformance between segment and reference value or setpoint value
    individual result is accepted if checking is not required.

A filter instruction 1811 to 1815 checked by checking block 183 accepts a frame 450 or a message 45 when all individual results are accepted. The filter process is then also completed. As a result, no further filter instruction 1811 to 1815 is processed for present frame 450 or a method 45. The sequence then continues to a step S4.

The filtering of filter module 18 in step S3 may be expressed as follows as pseudocode.

```
for n = 1 to 4 do
    if ((Segment[n] XOR setpoint value [s])
    AND (NOT mask [s])) = 0 then
        // conformance
    end if
end for
```

In step S4, it is checked whether frame 450 or message 45 is accepted. Optionally, an interrupt, in particular of the communication on bus 40 and/or the execution of application 11, may be triggered if filter instruction 1811 to 1815 requires this. If frame 450 or message 45 is accepted, the sequence thus continues to a step S5. If frame 450 or method 45 is not accepted, the sequence thus continues to a step S7.

In step S5, accepted frame 450 or method 45 is stored, in particular in result block 185. Frame 450 or message 45 is supplemented here in result block 185 with further pieces of information 455, namely, for example 455_1) Where frame 450 or message 45 is to be stored, a selection of multiple memories being able to be ready. At least one of the memories may be a storage queue according to the storage principle in which those elements which were first stored are also first taken out of the memory again (First in First Out (FIFO)).

455_2) Which filter instruction 1811 to 1815 has frame 450 or method 45 has fulfilled or has passed. In other words, a filter index is created.

455_3) Marking of frame 450 or message 45 controlled by fulfilled filter instruction 1811 to 1815, in particular priority (high or middle or low) or hazardous (blacklist).

The sequence then continues to a step S6.

In step S6, result block 185 passes on frame 450 or message 45 to application 11. Application 11 may thus, optionally without time delay or immediately, use the payload contained in frame 450 or message 45. The sequence then returns to step S1.

In step S7, non-accepted frame 450 or message 45 is discarded. Result block 185 thus does not pass on frame 450 or method 45 to application 11. The sequence then returns to step S1.

The method is ended when user station 10 or filter module 18 is switched off.

The above-described method may be designed using a pseudocode, for example, as follows:

```
Begin program acceptance filtering
    wait for the reception of a message
    wait until segment 4 has been received
    repeat for all filter instructions
        read filter instruction from the memory
        repeat for all segments 1..4 // sequential checking of the segments
            if checking of this segment is required by the filter instruction
                read corresponding reference data from the memory
                x = Segment[s] XOR reference data.setpoint value // bitwise comparison
                x = x AND (NOT reference data.mask) // bitwise masking
                ü[n] = TRUE if x = 0 otherwise FALSE // ü = conformance
                if filter instruction requires the inversion of the result
                    ü[n] = NOT ü[n]
                otherwise ü[n] = TRUE
        ü = ü[1] AND ü[2] AND ü[3] AND ü[4] //ascertain conformance over all segments
        if ü = FALSE then check next filter instruction
    if ü = FALSE // No matching filter instruction found
        Read alternative filter instruction from memory //no checking of the segments, only instructions
```

```
//execute instructions
  trigger interrupt if filter instruction requires this
  supplement items of information in the message according to filter
instruction
      FilterIndex
      Blacklist
  pass on message if filter instruction requires this
End Program acceptance filtering
```

According to a second exemplary embodiment, segments SG1 to SGn are not all equal in length, as shown in the example of FIG. 2. Instead, in the present exemplary embodiment, at least one segment of segments SG1 to SGn has a different length than the other segments of segments SG1 to SGn.

In this case, for example, only a certain section of a segment may be compared to the entire other segment, or in particular to a reference value. Alternatively, only a predetermined section of a segment may be compared to a predetermined section of another segment, or in particular to a reference value. In particular, the beginning of segment SG1 in arbitration field may be compared to segment SG3 of the data field and/or the end of segment SG1 is compared to segment SG4 of the data field. Arbitrary other variants for a comparison of sections of segments SG1 to SGn are possible.

Otherwise, the functionality of bus system 1 in the second exemplary embodiment is identical to the functionality as described above for the first exemplary embodiment.

All above-described embodiments of user stations 10, 20, 30, of bus system 1, and the method carried out therein may be used individually or in all possible combinations. In particular, all features of the above-described exemplary embodiments and/or their modifications may be combined arbitrarily. Additionally or alternatively, the following modifications are possible in particular.

Although the present invention is described above on the basis of the example of the CAN bus system, the present invention may be used in any communication network and/or communication method in which acceptance filtering is carried out for data from bus 40. In particular, the present invention is usable in developments of other serial communication networks, such as ethernet and/or 100 base T1 ethernet, fieldbus systems, etc.

In particular, bus system 1 according to the exemplary embodiments may be a communication network in which data are transferable serially at two different bit rates. It is advantageous, but not a necessary condition, that in bus system 1, an exclusive, collision-free access of a user station 10, 20, 30 to a shared channel is ensured at least for certain time spans.

The number and arrangement of user stations 10, 20, 30 in bus system 1 of the exemplary embodiment is arbitrary. In particular, user station 20 in bus system 1 may be omitted. It is possible that one or multiple of user stations 10 or 30 are provided in bus system 1. It is possible that all user stations in bus system 1 are designed identically, thus only user station 10 or only user station 30 is provided.

What is claimed is:

1. A user station for a serial bus system, the user station comprising:
an application configured for carrying out a task;
a transceiver unit configured for serially receiving a message in the form of a frame from a bus of the bus system via which the user station and other user stations of the bus system exchange messages with one another; and
a filter module for filtering the received frame, wherein:
the filter module for filtering is configured to use filter instructions and reference data to check at least two different segments of the frame separately to determine whether or not the received frame is to be passed on to the application; and
the user station includes at least one of the following four features (a)-(e):
(a) the checking of the at least two different segments by the filter module is based on the filter instructions for performing comparisons to the reference data of which a same reference data is used for at least one of (I) more than one of the filter instructions and (II) respective comparisons to more than one of the at least two different segments;
(b) the filter module includes:
a first memory block configured to store the filter instructions;
a second memory block configured to store the reference data for comparison to one or more of the at least two different segments of the received frame; and
a checking block configured to check the filter instructions with respect to the reference data to determine whether or not the received frame is to be passed on to the application;
(c) (I) the filter instructions include (i) at least one first instruction indicating which received frame is to be accepted and (ii) at least one second instruction indicating what is to be carried out using an accepted frame, and (II) at least one of:
(i) the at least one second instruction indicates: in which memory area the received and accepted frame is to be stored and/or that and how the received frame is to be marked; and
(ii) the filter module is configured to add predetermined pieces of information including specifications on the completed filtering to the received and accepted frame;
(d) the reference data includes:
a reference value provided for bitwise comparison to at least one of the segments to obtain a comparison result; and
a mask using which the comparison result is bitwise masked, the reference value and the mask each having the same bit width as each of the at least one segment; and
(e) the frame formed for the message is constructed compatibly to CAN FD, and, in a first communication phase of the frame, a negotiation of which of the user stations of the bus system receives an at least temporarily exclusive, collision-free access to the bus in a following second communication phase occurs.

2. The user station as recited in claim 1, wherein the checking of the at least two different segments by the filter module is based on the filter instructions for performing the comparisons to the reference data of which a same reference data is used for more than one of the filter instructions.

3. The user station as recited in claim 1, wherein the filter module includes:
the first memory block configured to store the filter instructions;
the second memory block configured to store the reference data for comparison to the one or more of the at least two different segments of the received frame; and
the checking block configured to check the filter instructions with respect to the reference data to determine whether or not the received frame is to be passed on to the application.

4. The user station as recited in claim 1, wherein the filter instructions define which segment of the received frame is to be compared to which reference data.

5. The user station as recited in claim 1, wherein the filter instructions define how results of the comparisons are to be logically linked to form an overall result.

6. The user station as recited in claim 1, wherein the filter instructions include:
the at least one first instruction indicating which received frame is to be accepted; and
the at least one second instruction indicating what is to be carried out using the accepted frame.

7. The user station as recited in claim 6, wherein the at least one second instruction indicates:
in which memory area the received and accepted frame is to be stored; and/or
that and how the received frame is to be marked.

8. The user station as recited in claim 6, wherein the filter module is configured to add the predetermined pieces of information including the specifications on the completed filtering to the received and accepted frame.

9. The user station as recited claim 1, wherein the reference data include:
the reference value provided for the bitwise comparison to the at least one of the segments to obtain the comparison result; and
the mask using which the comparison result is bitwise masked, the reference value and the mask each having the same bit width as the each of the at least one segment.

10. The user station as recited in claim 1, wherein all of the segments have the same bit width.

11. The user station as recited in claim 1, wherein at least one of the segments has a different bit width than at least one other of the segments.

12. The user station as recited in claim 1, wherein the frame formed for the message is constructed compatibly to CAN FD, and, in the first communication phase of the frame, the negotiation of which of the user stations of the bus system receives the at least temporarily exclusive, collision-free access to the bus in the following second communication phase occurs.

13. A bus system, comprising:
a bus; and
at least two user stations connected to one another via the bus, a first one of the at least two user stations including:

an application configured for carrying out a task;
a transceiver unit configured for serially receiving a message in the form of a frame from a bus of the bus system via which the first user station and another of the at least two user stations of the bus system exchange messages with one another; and
a filter module for filtering the received frame;
wherein:
the filter module for filtering is configured to use filter instructions and reference data to check at least two different segments of the frame separately to determine whether or not the received frame is to be passed on to the application; and
the bus system includes at least one of the following four features (a)-(e):
(a) the checking of the at least two different segments by the filter module is based on the filter instructions for performing comparisons to the reference data of which a same reference data is used for at least one of (I) more than one of the filter instructions and (II) respective comparisons to more than one of the at least two different segments;
(b) the filter module includes:
a first memory block configured to store the filter instructions;
a second memory block configured to store the reference data for comparison to one or more of the at least two different segments of the received frame; and
a checking block configured to check the filter instructions with respect to the reference data to determine whether or not the received frame is to be passed on to the application;
(c) (I) the filter instructions include (i) at least one first instruction indicating which received frame is to be accepted and (ii) at least one second instruction indicating what is to be carried out using an accepted frame, and (II) at least one of:
(i) the at least one second instruction indicates: in which memory area the received and accepted frame is to be stored and/or that and how the received frame is to be marked; and
(ii) the filter module is configured to add predetermined pieces of information including specifications on the completed filtering to the received and accepted frame;
(d) the reference data includes:
a reference value provided for bitwise comparison to at least one of the segments to obtain a comparison result; and
a mask using which the comparison result is bitwise masked, the reference value and the mask each having the same bit width as each of the at least one segment; and
(e) the frame formed for the message is constructed compatibly to CAN FD, and, in a first communication phase of the frame, a negotiation of which of the user stations of the bus system receives an at least temporarily exclusive, collision-free access to the bus in a following second communication phase occurs.

14. A method for communication in a serial bus system, the method being carried out using a user station of the bus system, the user station including an application for carrying out a task, a transceiver unit, and a filtering module, the method comprising the following steps:

serially receiving, using the transceiver unit, a message in the form of a frame from a bus of the bus system via which the user station and other user stations of the bus system exchange messages with one another; and filtering, using the filter module, the received frame, wherein:

the filter module, in the filtering step, uses filter instructions and reference data to check at least two different segments of the frame separately to determine whether or not the received frame is to be passed on to the application; and the method includes at least one of the following four features (a)-(d):

(a) the checking of the at least two different segments by the filter module is based on the filter instructions for performing comparisons to the reference data of which a same reference data is used for at least one of (I) more than one of the filter instructions and (II) respective comparisons to more than one of the at least two different segments;

(b) the filter module includes:
  a first memory block configured to store the filter instructions;
  a second memory block configured to store the reference data for comparison to one or more of the at least two different segments of the received frame; and
  a checking block configured to check the filter instructions with respect to the reference data to determine whether or not the received frame is to be passed on to the application;

(c) (I) the filter instructions include (i) at least one first instruction indicating which received frame is to be accepted and (ii) at least one second instruction indicating what is to be carried out using an accepted frame, and (II) at least one of:
  (i) the at least one second instruction indicates: in which memory area the received and accepted frame is to be stored and/or that and how the received frame is to be marked; and
  (ii) the filter module is configured to add predetermined pieces of information including specifications on the completed filtering to the received and accepted frame;

(d) the reference data includes:
  a reference value provided for bitwise comparison to at least one of the segments to obtain a comparison result; and
  a mask using which the comparison result is bitwise masked, the reference value and the mask each having the same bit width as each of the at least one segment; and (e) the frame formed for the message is constructed compatibly to CAN FD, and, in a first communication phase of the frame, a negotiation of which of the user stations of the bus system receives an at least temporarily exclusive, collision-free access to the bus in a following second communication phase occurs.

15. The user station as recited in claim 1, wherein the checking of the at least two different segments by the filter module is based on the filter instructions for performing the comparisons to the reference data of which a same reference data is used for the respective comparisons to more than one of the at least two different segments.

* * * * *